(12) United States Patent
Li

(10) Patent No.: US 10,827,107 B2
(45) Date of Patent: Nov. 3, 2020

(54) PHOTOGRAPHING METHOD FOR TERMINAL AND TERMINAL

(71) Applicant: Huawei Technologies Co., Ltd., Shenzhen (CN)

(72) Inventor: Jiangwei Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/345,603

(22) PCT Filed: Dec. 5, 2016

(86) PCT No.: PCT/CN2016/108606
§ 371 (c)(1),
(2) Date: Apr. 26, 2019

(87) PCT Pub. No.: WO2018/076460
PCT Pub. Date: May 3, 2018

(65) Prior Publication Data
US 2019/0253593 A1    Aug. 15, 2019

(30) Foreign Application Priority Data

Oct. 28, 2016  (CN) .......................... 2016 1 0964290
Dec. 1, 2016  (WO) ................ PCT/CN2016/108271

(51) Int. Cl.
*H04N 5/225*  (2006.01)
*H04N 5/232*  (2006.01)
(Continued)

(52) U.S. Cl.
CPC ......... *H04N 5/2258* (2013.01); *G06K 9/3233* (2013.01); *G06T 5/003* (2013.01);
(Continued)

(58) Field of Classification Search
CPC .. H04N 5/2258; H04N 9/045; H04N 5/23296; H04N 5/23232; H04N 5/2628;
(Continued)

(56) References Cited

U.S. PATENT DOCUMENTS 9,819,931 B2 *  11/2017  Lee .................... H04N 5/23212
2010/0045809 A1  2/2010  Packard
(Continued)

FOREIGN PATENT DOCUMENTS

CN  101150731 A  3/2008
CN  103546730 A  1/2014
(Continued)

OTHER PUBLICATIONS

XP055616841, Anonymous, "Huawei P9-Full phone specifications", Oct. 26, 2016, 2 pages.
(Continued)

*Primary Examiner* — Nhan T Tran
*Assistant Examiner* — Chriss S Yoder, III
(74) *Attorney, Agent, or Firm* — Slater Matsil, LLP

(57) ABSTRACT

A method includes: obtaining a target zoom ratio; simultaneously photographing a monochrome image and a color image of a target scene based on the target zoom ratio, where resolution of the monochrome image is higher than that of the color image, and there is at least one monochrome image and at least one color image; correspondingly cropping the monochrome image and the color image based on the target zoom ratio, where a field of view corresponding to a monochrome image obtained through cropping is the same as a field of view corresponding to a color image obtained through cropping; and performing fusion on the monochrome image obtained through cropping and the color image obtained through cropping, to obtain a color zoom image.

18 Claims, 11 Drawing Sheets

(51) Int. Cl.
  *G06T 3/40* (2006.01)
  *G06K 9/32* (2006.01)
  *H04N 5/262* (2006.01)
  *G06T 7/593* (2017.01)
  *G06T 7/194* (2017.01)
  *G06T 5/00* (2006.01)
  *G06T 5/50* (2006.01)
  *H04N 9/04* (2006.01)

(52) U.S. Cl.
  CPC ............ *G06T 5/50* (2013.01); *G06T 7/194* (2017.01); *G06T 7/593* (2017.01); *H04N 5/23232* (2013.01); *H04N 5/23296* (2013.01); *H04N 5/2628* (2013.01); *H04N 9/045* (2013.01)

(58) Field of Classification Search
  CPC .......... H04N 13/25; H04N 2013/0081; H04N 5/2226; H04N 5/23229; H04N 5/23299; H04M 1/72519; H04M 1/0264; G06T 5/50; G06T 5/003; G06T 7/194; G06T 7/593; G06T 2207/20132; G06K 9/3233; G03B 19/07
  See application file for complete search history.

(56) References Cited

U.S. PATENT DOCUMENTS

| | | |
|---|---|---|
| 2011/0169921 A1 | 7/2011 | Lee et al. |
| 2011/0169969 A1 | 7/2011 | Matsuda et al. |
| 2012/0026366 A1* | 2/2012 | Golan ............... H04N 5/232 348/240.2 |
| 2013/0016251 A1 | 1/2013 | Ogasahara |
| 2013/0201391 A1 | 8/2013 | Ogasahara et al. |
| 2013/0335599 A1 | 12/2013 | Zhang |
| 2014/0071264 A1 | 3/2014 | Seo |
| 2014/0320611 A1 | 10/2014 | Choi |
| 2015/0278996 A1 | 10/2015 | Tsutsumi |
| 2016/0117829 A1 | 4/2016 | Yoon et al. |
| 2017/0064174 A1 | 3/2017 | Xiao |
| 2017/0374281 A1* | 12/2017 | Kim ............... H04N 5/2353 |
| 2018/0160040 A1 | 6/2018 | Shabtay et al. |
| 2018/0332223 A1* | 11/2018 | Lin ............... H04N 5/23241 |

FOREIGN PATENT DOCUMENTS

| | | |
|---|---|---|
| CN | 103856719 A | 6/2014 |
| CN | 103986867 A | 8/2014 |
| CN | 104363375 A | 2/2015 |
| CN | 104424640 A | 3/2015 |
| CN | 105049718 A | 11/2015 |
| CN | 105556944 A | 5/2016 |
| CN | 105847660 A | 8/2016 |
| CN | 106060412 A | 10/2016 |
| EP | 2579572 A1 | 4/2013 |
| EP | 2852150 A1 | 3/2015 |
| JP | H0946730 A | 2/1997 |
| JP | 2001506812 A | 5/2001 |
| JP | 2011146873 A | 7/2011 |
| JP | 2012015620 A | 1/2012 |
| JP | 2013026672 A | 2/2013 |
| JP | 2013162291 A | 8/2013 |
| JP | 2013546238 A | 12/2013 |
| JP | 2015159357 A | 9/2015 |
| JP | 2015197745 A | 11/2015 |
| KR | 101389865 B1 | 4/2014 |
| WO | 9815126 A1 | 4/1998 |

OTHER PUBLICATIONS

XP055616865 Anonymous:"LG G5-Full phone specifications",dated Oct. 26, 2016, total 2 pages.

* cited by examiner

Color pixels (Bayer array)

Monochrome pixels

Back of a mobile phone   Front of a mobile phone

PHOTOGRAPHING METHOD FOR TERMINAL AND TERMINAL

CROSS-REFERENCE TO RELATED APPLICATIONS

This application is a national stage of International Application No. PCT/CN2016/108606, filed on Dec. 5, 2016, which claims priority to Chinese Patent Application No. 201610964290.0, filed on Oct. 28, 2016 and International Application No. PCT/CN2016/108271, filed on Dec. 1, 2016. All of the aforementioned applications are hereby incorporated by reference in their entireties.

TECHNICAL FIELD

Embodiments of the present invention relate to the image processing field, and in particular, to a photographing method for a terminal having a monochrome camera lens and a color camera lens, and a terminal.

BACKGROUND

A photographing effect of a mobile phone is always an important factor that affects selection of different mobile phones by users, and a mobile phone having a better photographing effect is more favored by a consumer. A focal length greatly affects the photographing effect of the mobile phone. An 85 mm focal length may provide proper character and environment descriptions for an image. When a portrait is photographed by using the 85 mm focal length, it may be relatively convenient to perform switching between a half-length portrait and a full-length portrait, there is minimum perspective distortion, and a figure is little distorted. In addition, compared with another different focal length, the 85 mm focal length is easier to create a shallow depth of field effect by using a wide aperture. In addition, a field of view (Field of view, FOV for short) is also an important factor that affects the photographing effect of the mobile phone. A magnitude of the field of view is related to a focal length of a camera lens.

In the prior art, iPhone 7 Plus has two rear-facing color camera lenses with 12 megapixels. An equivalent focal length of a wide-angle camera lens is 28 mm, and an aperture value is f/1.8. An equivalent focal length of a long-focus camera lens is 56 mm, and an aperture value is f/2.8. In a portrait mode, the long-focus camera lens has a shallow depth of field effect, and the wide-angle camera lens obtains a clear foreground image. With the twin camera lenses, iPhone 7 Plus can implement 2× optical zoom, and then achieve a portrait photographing effect of the 56 mm focal length.

In the prior art, in the portrait mode, iPhone 7 Plus implements 2× optical zoom based on the long-focus lens with the 56 mm focal length. Because the equivalent focal length of the long-focus camera lens is twice that of the wide-angle camera lens, iPhone 7 Plus can implement only an optical zoom effect at a zoom ratio 2×, and a zoom effect at a variable zoom ratio cannot be implemented because the zoom ratio 2× of iPhone 7 Plus is limited by a focal length of an optical lens.

SUMMARY

Embodiments of the present invention provide a photographing method of for terminal and a terminal, to implement zoom effects at different zoom ratios and a wide aperture effect.

A first aspect of the embodiments of the present invention provides a photographing method for a terminal, including: at least two camera lenses, where one lens is a color camera lens, the other lens is a monochrome camera lens, and the monochrome camera lens and the color camera lens are disposed in parallel on a same side of the terminal. A target zoom ratio is obtained based on zooming performed by a user, and then a color image and a monochrome image of a target scene are simultaneously photographed. Because resolution of the color camera lens is lower than that of the black camera lens, the monochrome image expresses more detail information of the target scene than that expressed by the color image. Then, the color image and the monochrome image are correspondingly cropped based on the target zoom ratio, and it is ensured that a color image obtained through cropping and a monochrome image obtained through cropping have a same field of view. Finally, fusion is performed on the color image obtained through cropping and the monochrome image obtained through cropping, to obtain a color zoom image.

It can be learned from the foregoing technical solutions that the method in this embodiment of the present invention has the following advantages:

A plurality of monochrome images and a plurality of color images that are simultaneously photographed and that are of the target scene are correspondingly cropped based on the target zoom ratio, and then fusion is performed on monochrome images obtained through cropping and color images obtained through cropping, to obtain the color zoom image. It may be understood that, in one aspect, because the field of view corresponding to the monochrome image obtained through cropping and the color image obtained through cropping is the same as that obtained through optical zoom whose zoom ratio is the target zoom ratio, and the resolution of the monochrome camera lens is higher than the resolution of the color camera lens, when the monochrome image obtained through cropping is compared with the color image obtained through cropping, resolution of the monochrome image obtained through cropping is still higher than that of the color image. Therefore, the color zoom image obtained through fusion has a higher detail resolution capability, and this is equivalent to an optical zoom effect at the same zoom ratio. Therefore, in this embodiment of the present invention, zoom effects at different zoom ratios can be implemented.

With reference to the first aspect of the embodiments of the present invention, in a first implementation of the first aspect of the embodiments of the present invention, the photographing method further includes: performing background blurring processing on the obtained color zoom image based on depth information of the target scene.

After background blurring processing is performed on the color zoom image based on the depth information, a photographed subject can be clearer, and a background is blurred, so that the photographed subject is more obvious.

With reference to the first implementation of the first aspect of the embodiments of the present invention, in a second implementation of the first aspect of the embodiments of the present invention, the photographing method further includes: determining, based on information collected by a gyro sensor, whether a photographing environment is in a relatively static state, where contrast information of an image is related to definition, detail representation, and grayscale level representation of an image, larger contrast information of the monochrome image indicates more obvious detail representation and grayscale level representation of the image, and larger contrast information of the color image indicates a clearer and more eye-catching image and a brighter color.

Therefore, when there are at least two black images, one target monochrome image with high image quality is first determined, from monochrome images obtained through cropping, based on the information collected by the gyro sensor and contrast information of the monochrome images. Likewise, when there are at least two color images, one target color image with high image quality is determined, from color images obtained through cropping, based on the information collected by the gyro sensor and contrast information of the color images. Then, depth calculation is performed on the target monochrome image and the target color image to obtain the depth information.

The target color image with high image quality and the target monochrome image with high image quality are selected by using the information collected by the gyro sensor, the contrast information of the monochrome images, and the contrast information of the color images, so that the depth information calculated by using a high-quality image is more accurate.

Optionally, the first aspect of the embodiments of the present invention further provides an implementation, where after the color zoom image is obtained, the method further includes: identifying a region of interest ROI in the color zoom image; and performing blurring processing on a region other than the region of interest in the color zoom image. In this manner, a wide aperture blurring effect can be implemented.

Optionally, the first aspect of the embodiments of the present invention further provides an implementation, where the performing blurring processing on a region other than the region of interest in the color zoom image is specifically: calculating scene depth information of the color zoom image according to a binocular stereoscopic vision principle; and performing blurring processing on the region other than the region of interest in the color zoom image based on foreground information of the color zoom image, an aperture value FUM of each of the monochrome camera lens and the color camera lens, and the scene depth information.

Optionally, the first aspect of the embodiments of the present invention further provides an implementation, where when there are at least two black images and/or at least two color images, the calculating scene depth information of the color zoom image according to a binocular stereoscopic vision principle is specifically: selecting, from the monochrome images and the color images based on contrast information of the monochrome images, contrast information of the color images, and information collected by a gyroscope of the terminal, one monochrome image and one color image that have minimum jitter information and/or maximum contrast information, and calculating the scene depth information of the color zoom image based on the selected monochrome image, the selected color image, and the binocular stereoscopic vision principle.

A second aspect of the embodiments of the present invention provides a terminal, including: at least two camera lenses, where one lens is a monochrome camera lens, the other lens is a color camera lens, the monochrome camera lens is configured to photograph a monochrome image, the color camera lens is configured to photograph a color image, resolution of the monochrome camera lens is higher than resolution of the color camera lens, and an optical axis of the monochrome camera lens is parallel to that of the color camera lens; a photographing module, configured to simultaneously photograph a monochrome image and a color image of a target scene, where resolution of the monochrome image is higher than that of the color image, and there is at least one monochrome image and at least one color image; a first determining module, configured to determine a target zoom ratio; a cropping module, configured to correspondingly crop the monochrome image and the color image based on the target zoom ratio, where a field of view corresponding to a monochrome image obtained through cropping is the same as a field of view corresponding to a color image obtained through cropping; and a fusion module, configured to perform fusion on the monochrome image obtained through cropping and the color image obtained through cropping, to obtain a color zoom image.

It can be learned from the foregoing technical solutions that the method in this embodiment of the present invention has the following advantages:

The photographing module simultaneously photographs a plurality of monochrome images and a plurality of color images of the target scene, the cropping module performs cropping correspondingly based on the target zoom ratio, and then the fusion module performs fusion on monochrome images obtained through cropping and color images obtained through cropping, to obtain the color zoom image. It may be understood that, in one aspect, because the monochrome image obtained through cropping and the color image obtained through cropping have a same field of view, and the resolution of the monochrome camera lens is higher than the resolution of the color camera lens, when the monochrome image obtained through cropping is compared with the color image obtained through cropping, resolution of the monochrome image obtained through cropping is still higher than that of the color image. Therefore, the color zoom image obtained through fusion has a higher detail resolution capability, and this is equivalent to an optical zoom effect at the same zoom ratio. Therefore, in this embodiment of the present invention, zoom effects at different zoom ratios can be implemented.

With reference to the second aspect of the embodiments of the present invention, in a first implementation of the first aspect of the embodiments of the present invention, the terminal further includes: a blurring module, configured to perform background blurring on the color zoom image based on depth information of the target scene.

The background blurring module may perform background blurring processing on the color zoom image, so that an image on which background blurring processing is performed is clearer, and has a brighter color.

With reference to the first implementation of the second aspect of the embodiments of the present invention, in a second implementation of the first aspect of the embodiments of the present invention, the method further includes: a second determining module, configured to: when there are at least two black images and/or at least two color images, determine, from monochrome images obtained through cropping and color images obtained through cropping, one target monochrome image with high image quality and one target color image with high image quality based on information collected by a gyro sensor, contrast information of the monochrome images, and contrast information of the color images; and a calculation module, configured to perform depth calculation on the target monochrome image and the target color image to obtain the depth information.

Depth calculation is performed by using the high-quality target color image and the high-quality target monochrome image that are determined by the second determining module, so that accuracy of the depth information can be effectively improved.

The terminal provided in the second aspect of the embodiments of the present invention may execute the method described in all implementations of the first aspect.

A third aspect of the embodiments of the present invention provides a terminal, including: a processor, a memory, and at least two camera lenses, where one lens is a monochrome camera lens, the other lens is a color camera lens, the monochrome camera lens is configured to photograph a monochrome image, the color camera lens is configured to photograph a color image, resolution of the monochrome camera lens is higher than resolution of the color camera lens, and an optical axis of the monochrome camera lens is parallel to that of the color camera lens, where the processor is configured to perform the following steps by invoking an operation instruction stored in the memory: simultaneously photographing a monochrome image and a color image of a target scene, where resolution of the monochrome image is higher than that of the color image, and there is at least one monochrome image and at least one color image; determining a target zoom ratio; correspondingly cropping the monochrome image and the color image based on the target zoom ratio, where a field of view corresponding to a monochrome image obtained through cropping is the same as a field of view corresponding to a color image obtained through cropping; and performing fusion on the monochrome image obtained through cropping and the color image obtained through cropping, to obtain a color zoom image.

The terminal provided in the third aspect of the embodiments of the present invention may execute the method in all implementations of the first aspect.

It can be learned from the foregoing technical solutions that the method in this embodiment of the present invention has the following advantages:

The processor correspondingly crops, based on the target zoom ratio, a plurality of monochrome images and a plurality of color images that are simultaneously photographed and that are of the target scene, and then performs fusion on monochrome images obtained through cropping and color images obtained through cropping, to obtain the color zoom image. It may be understood that, in one aspect, because the monochrome image obtained through cropping and the color image obtained through cropping have a same field of view, and the resolution of the monochrome camera lens is higher than the resolution of the color camera lens, when the monochrome image obtained through cropping is compared with the color image obtained through cropping, resolution of the monochrome image obtained through cropping is still higher than that of the color image. Therefore, the color zoom image obtained through fusion has a higher detail resolution capability, and this is equivalent to an optical zoom effect at the same zoom ratio. Therefore, in this embodiment of the present invention, zoom effects at different zoom ratios can be implemented.

With reference to the third aspect of the embodiments of the present invention, in a first possible implementation of the third aspect of the embodiments of the present invention, the processor is further configured to perform the following step: performing background blurring on the color zoom image based on depth information of the target scene.

The processor performs background blurring processing on the color zoom image, so that an image on which background blurring processing is performed is clearer, and has a brighter color.

With reference to the first possible implementation of the third aspect of the embodiments of the present invention, in a second possible implementation of the third aspect of the embodiments of the present invention, the processor is further configured to perform the following steps: when there are at least two black images and/or at least two color images, determining, from monochrome images obtained through cropping and color images obtained through cropping, one target monochrome image with high image quality and one target color image with high image quality based on information collected by a gyro sensor, contrast information of the monochrome images, and contrast information of the color images; and performing depth calculation on the target monochrome image and the target color image to obtain the depth information.

The processor performs depth calculation after determining the high-quality target color image and the high-quality target monochrome image based on the information collected by the gyro sensor and the contrast information, so that accuracy of the depth information can be effectively improved.

DETAILED DESCRIPTION OF ILLUSTRATIVE EMBODIMENTS

Embodiments of the present invention provide a photographing method for a terminal and a terminal, to implement zoom effects at different zoom ratios and a wide aperture effect.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "have" and any other variants mean to cover a non-exclusive inclusion, for example, a process, method, system, product, or device that includes a list of steps or units is not necessarily limited to those steps or units that are expressly listed, but may include other steps or units not expressly listed or inherent to such a process, method, product, or device.

A mobile phone has become an indispensable electronic product in people's daily life, and a photographing capability of the mobile phone is favored by people. A higher pixel of the mobile phone brings a better photographing effect. In a photographing process, an aperture and a focal length may be usually adjusted to make a photographed object clearer. An amount of light admitted depends on the aperture which is also an important factor on which depth of field depends. A larger aperture is corresponding to a smaller aperture value and indicates shallower depth of field, and a smaller aperture is corresponding to a larger aperture value and indicates deeper depth of field. An imaging size of the photographed object depends on the focal length. During photographing, the focal length may be adjusted, that is, zooming may be performed. A zooming manner may fall into two types: optical zoom and digital zoom. A pixel of a photo can be improved through zooming, so that the photographed object becomes clearer.

To facilitate understanding of the photographing method for a terminal in the embodiments of the present invention, the following describes an embodiment of the photographing method for a terminal in the embodiments of the present invention.

Figure 1:
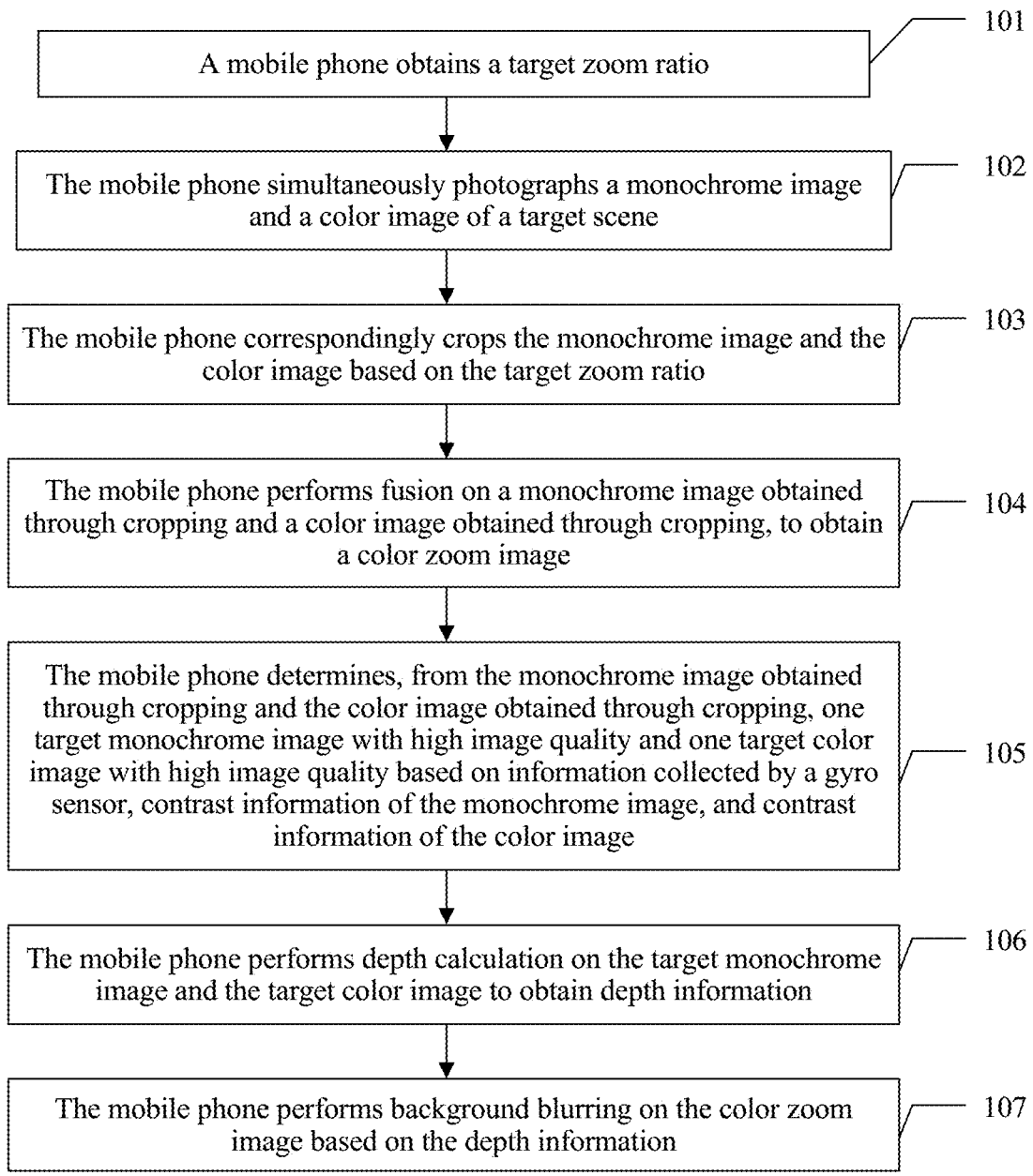
FIG. 1 is a schematic diagram of an embodiment of a photographing method for a terminal according to an embodiment of the present invention.

That the terminal is a mobile phone is used as an example. Referring to FIG. 1, an embodiment of the photographing method in the embodiments of the present invention is described in detail, and includes the following steps.

101. The mobile phone obtains a target zoom ratio.

Figure 17:
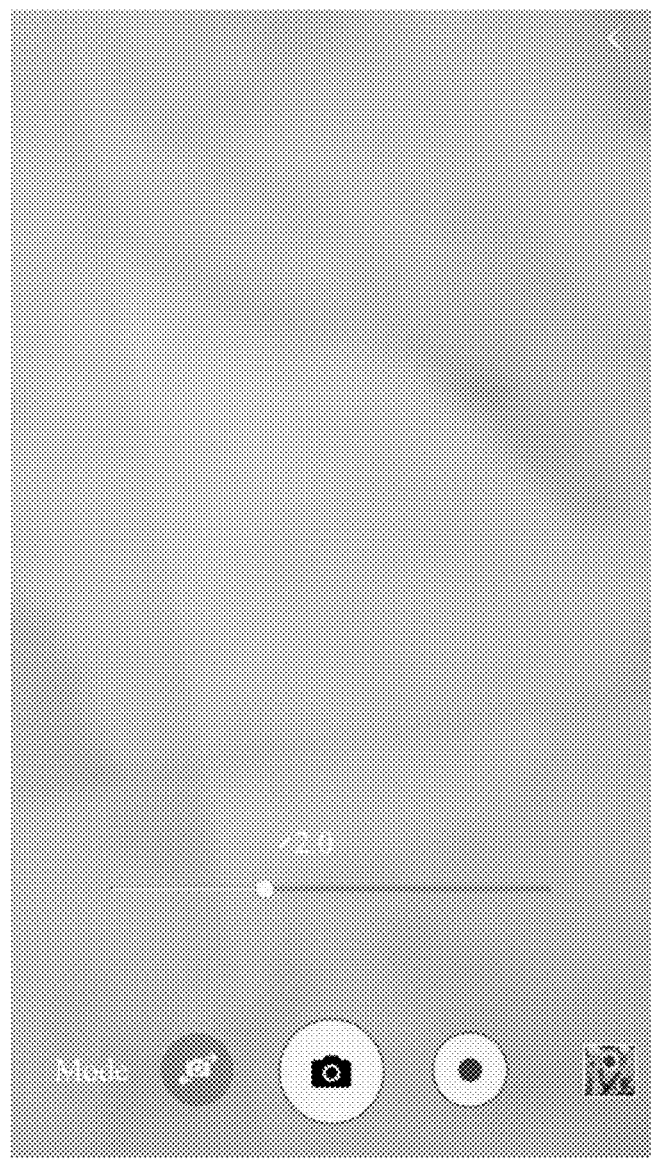
FIG. 17 is a schematic diagram of obtaining a target zoom ratio according to an embodiment of the present invention.

In this embodiment, as shown in FIG. 17, a user starts a camera application, and the mobile phone presents a preview interface of the camera. The user may adjust the target zoom ratio in the preview interface by pinching two fingers. As shown in FIG. 17, the target zoom ratio is 2×. If the user does not perform zooming, the target zoom ratio is 1× by default. When the user performs zooming, the preview interface of the camera changes accordingly, for example, an image in the preview interface is zoomed in or zoomed out.

102. The mobile phone simultaneously photographs a monochrome image and a color image of a target scene based on the target zoom ratio.

In this embodiment, the mobile phone has two camera lenses, one lens is a monochrome camera lens, and the other lens is a color camera lens. Resolution of the black camera lens is at least 1.6 times that of the color camera lens. The two camera lenses are disposed in parallel, so that optical axes of the two camera lenses are parallel. The color camera lens of the mobile phone photographs a color image, and the monochrome camera lens simultaneously photographs a monochrome image whose photographing scene is consistent with that of the color image. Finally, the mobile phone obtains at least one color image and at least one monochrome image, for example, eight frames of color images and eight frames of monochrome images. If the user performs zooming, an image is photographed based on a ratio obtained after the user performs zooming. If the user does not perform zooming, photographing is performed based on a default setting of the two camera lenses. The default setting may be that the user does not perform zooming after starting the camera application.

Figure 2:
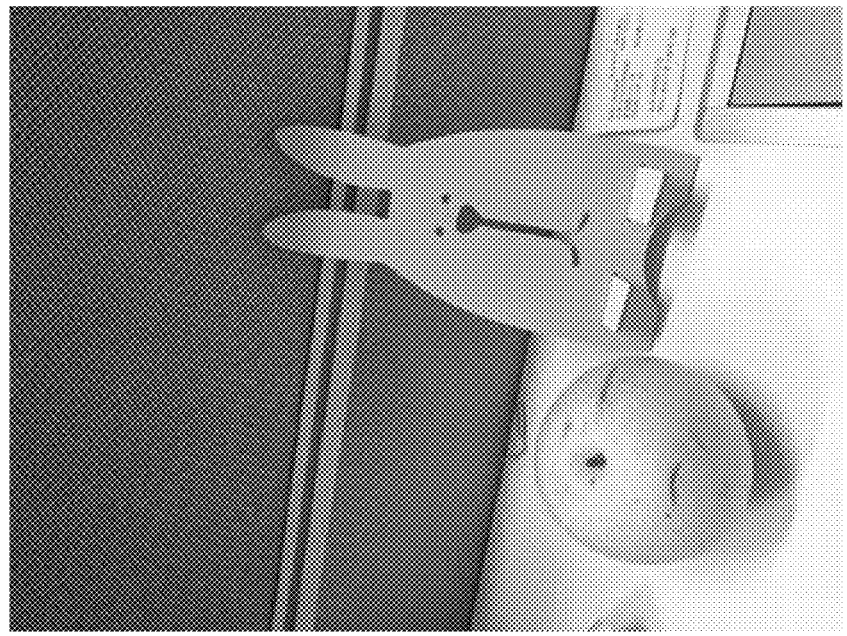
FIG. 2 is a monochrome image photographed by a black camera lens according to an embodiment of the present invention.
Figure 3:
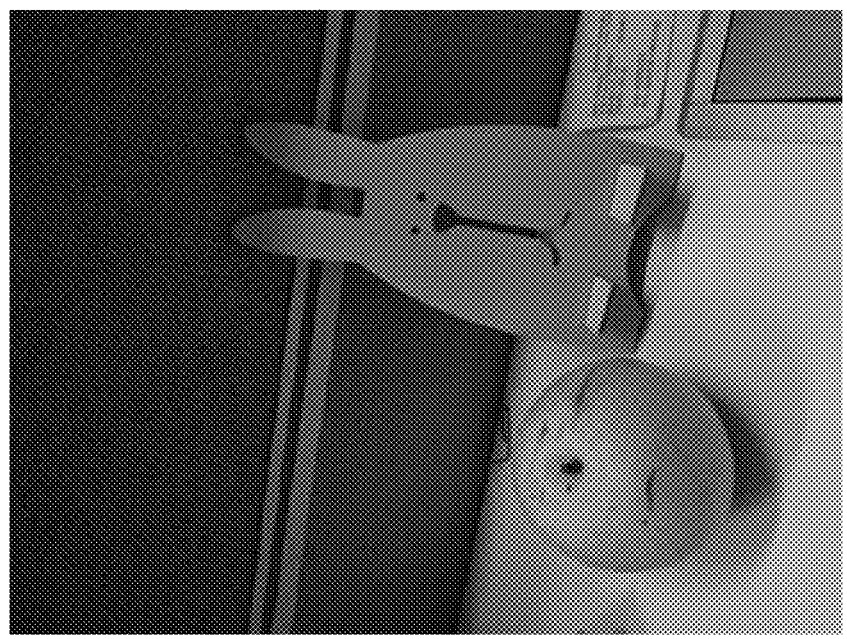
FIG. 3 is a color image photographed by a color camera lens according to an embodiment of the present invention.

The monochrome image photographed by the monochrome camera lens is shown in FIG. 2. The color image photographed by the color camera lens is shown in FIG. 3 (because a color image cannot be used in an application file, the color image shown in FIG. 3 is displayed as a grayscale image). Resolution of the monochrome image shown in FIG. 2 is approximately 1.6 times that of the image shown in FIG. 3.

103. The mobile phone correspondingly crops the monochrome image and the color image based on the target zoom ratio.

Figure 4:
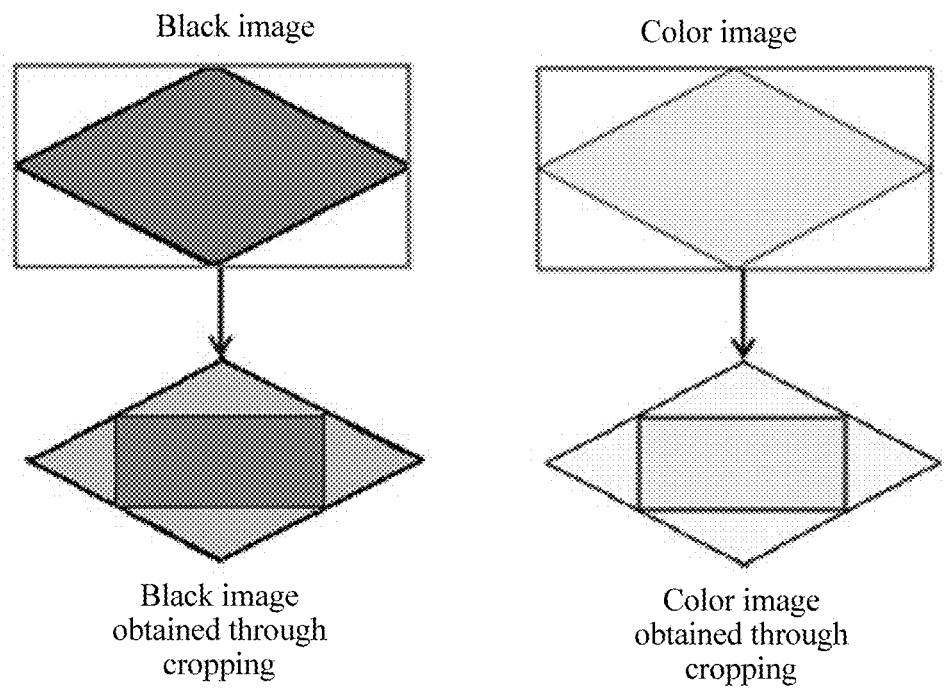
FIG. 4 is a schematic diagram of image cropping according to an embodiment of the present invention.

In this embodiment, the mobile phone crops a plurality of frames of photographed color images and a plurality of frames of photographed black images. Specifically, at the target zoom ratio, cropping is performed in center areas of the color image and the monochrome image, to ensure that the center areas have a same field of view. A cropping schematic diagram is shown in FIG. 4. When the target zoom ratio is n×, assuming that the resolution of the color image is cH*cW, and a corresponding size is C*D, an image whose size is $$\frac{C}{2^n} * \frac{D}{2^n}$$

is obtained through cropping in the center of the color image, that is, a color image obtained through cropping, and resolution of the image obtained through cropping is changed to $$\frac{cH}{2^n} * \frac{cW}{2^n}.$$

Likewise, assuming that the resolution of the monochrome image is mH*mW, and a corresponding size is M*N, an image whose size is $$\frac{M}{2^n} * \frac{N}{2^n}$$

is obtained through cropping in the center of the monochrome image, that is, a color image obtained through cropping, and resolution of the image obtained through cropping is changed to $$\frac{mH}{2^n} * \frac{mW}{2^n}.$$

After such cropping, a field of view corresponding to the images obtained through cropping is the same as that obtained through optical zoom whose zoom ratio is n×, and a multiple relationship between the resolution of the monochrome image obtained through cropping and that of the color image obtained through cropping is still the same as a multiple relationship between the resolution of the black camera lens and that of the color camera lens, that is, if the resolution of the black camera lens is 1.6 times that of the color camera lens, the resolution of the monochrome image obtained through cropping is also 1.6 times that of the color image obtained through cropping.

Figure 5:
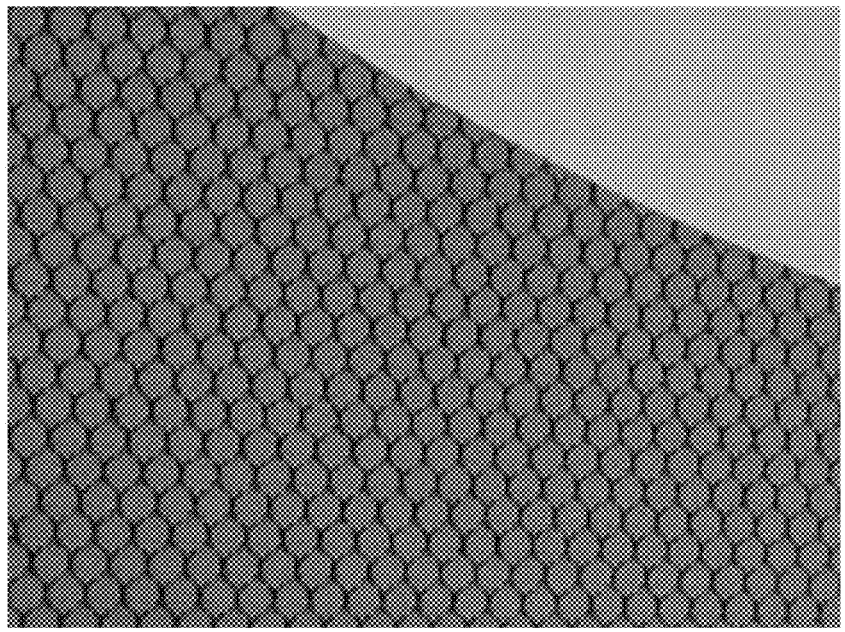
FIG. 5 is a monochrome image obtained through cropping according to an embodiment of the present invention.
Figure 6:
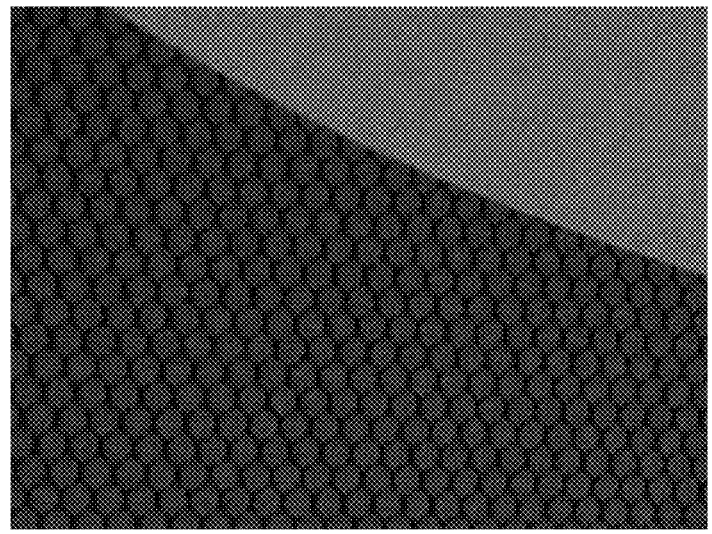
FIG. 6 is a color image obtained through cropping according to an embodiment of the present invention.

When the target zoom ratio n is 3, after the monochrome image in FIG. 2 and the color image in FIG. 3 are correspondingly cropped according to the foregoing cropping method, a monochrome image shown in FIG. 5 and a color image shown in FIG. 6 (because a color image cannot be used in an application file, the color image shown in FIG. 6 is displayed as a grayscale image) are obtained. After the foregoing cropping, resolution of the monochrome image shown in FIG. 5 is still 1.6 times that of the color image shown in FIG. 6.

104. The mobile phone performs fusion on a monochrome image obtained through cropping and a color image obtained through cropping, to obtain a color zoom image.

Figure 7:
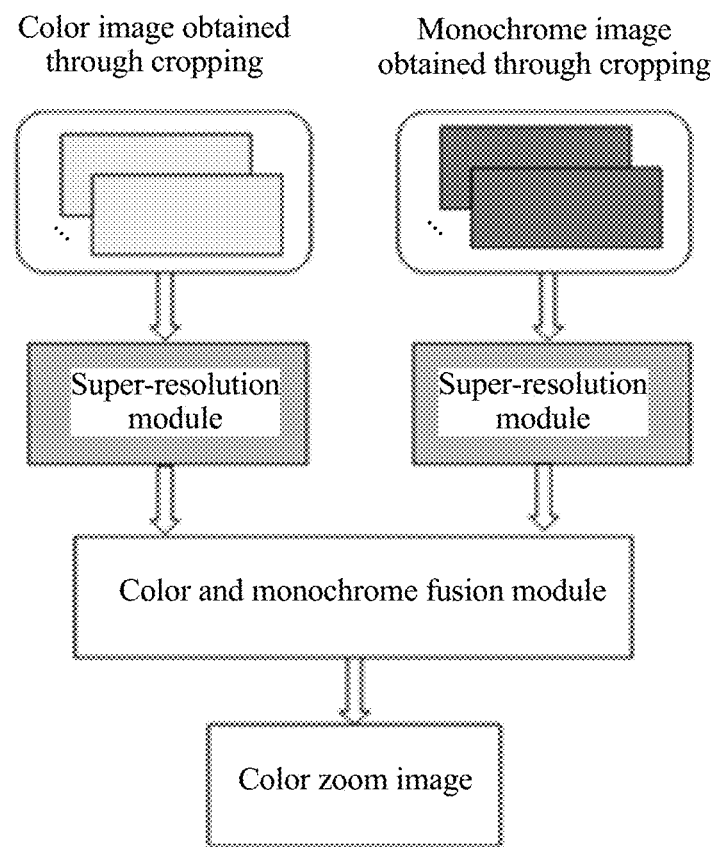
FIG. 7 is a schematic diagram of image fusion according to an embodiment of the present invention.
Figure 8:
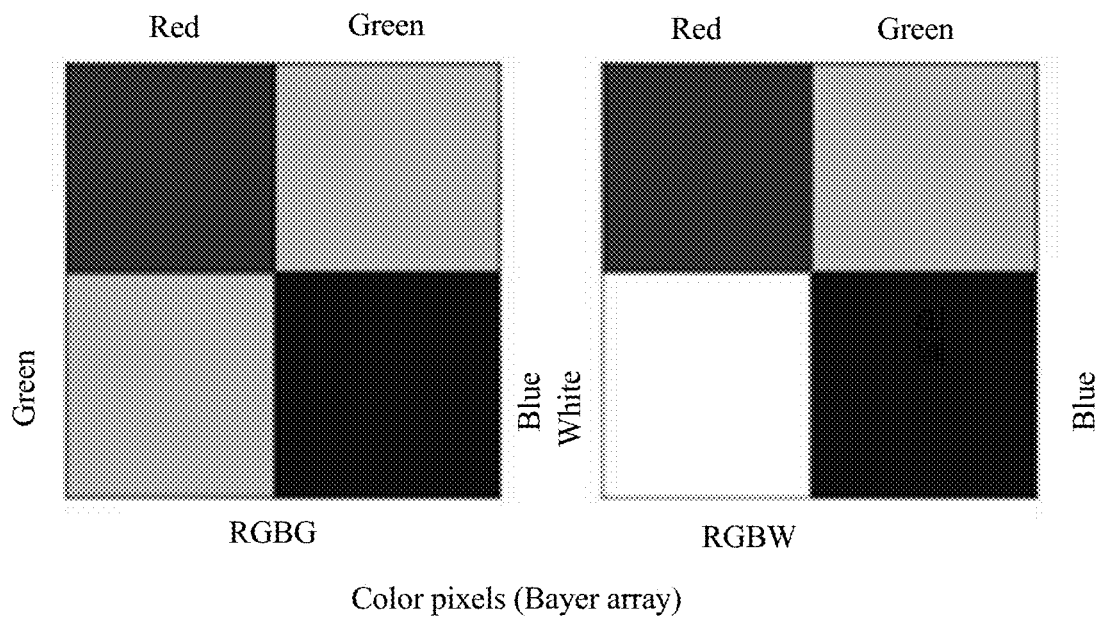
FIG. 8 is a schematic diagram of color pixels according to an embodiment of the present invention.
Figure 9:
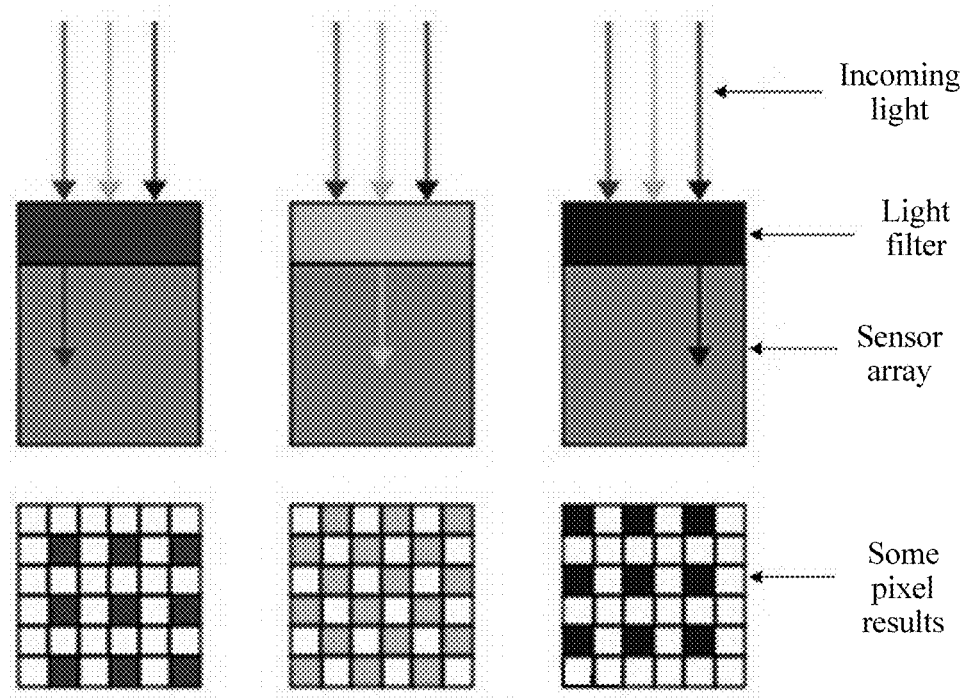
FIG. 9 is a schematic diagram of a color pixel combination process according to an embodiment of the present invention.
Figure 10:
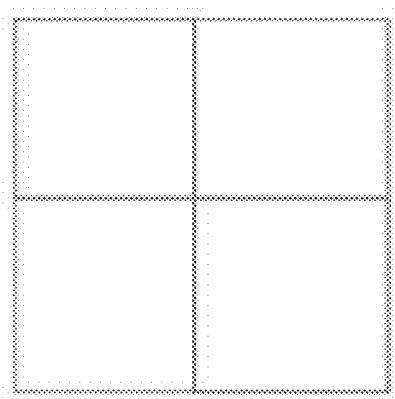
FIG. 10 is a schematic diagram of monochrome pixels according to an embodiment of the present invention.

In this embodiment, after a cropping operation is performed on the color image and the monochrome image in step 103, as shown in FIG. 7, the mobile phone first uses a super-resolution module to perform super-resolution processing on each of the color image obtained through cropping and the monochrome image obtained through cropping, to improve resolution of an original image, and then uses a color and monochrome fusion module to perform fusion on images obtained after super-resolution processing is performed, to obtain the color zoom image. The super-resolution module is a module that improves, by using an interpolation algorithm, the resolution of the color image obtained through cropping and the resolution of the monochrome image obtained through cropping. For pixel distribution of the color camera lens, refer to a Bayer array shown in FIG. 8. The Bayer array includes two different arrangements: an RGBR arrangement and an RGBW arrangement. As shown in FIG. 9, in the Bayer array, in a process in which incoming light is incident onto each pixel, some colors are filtered out by a light filter corresponding to each pixel, and only intensity of the some colors is retained on each pixel. Therefore, in a later imaging process, a de-Bayer operation needs to be performed by using every four RGBR or RGBW pixels as a group, and then combination is performed with reference to color intensity on an adjacent pixel and a red green blue combination principle, to reproduce original colors of a photographed object. In a pixel combination process shown in FIG. 9, nearly 70% energy is lost when the incoming light is incident onto a pixel. For a pixel distribution diagram of the monochrome camera lens, refer to FIG. 10. Each pixel independently stores grayscale information of an image of the photographed object, and detail information of the image is retained to a maximum degree. Therefore, a detail resolution capability of the monochrome image obtained through cropping is far higher than that of the color image obtained through cropping. In conclusion, in one aspect, both the image resolution and the image detail resolution capability of the monochrome image obtained through cropping are higher than those of the color image obtained through cropping, and in another aspect, a field of view corresponding to an image obtained through cropping based on the target zoom ratio is equal to that obtained through optical zoom at the same zoom ratio, so that a detail resolution capability of the color zoom image finally obtained through fusion is greatly improved, and this is equivalent to an optical zoom effect at the same zoom ratio.

In addition, in this embodiment, it should be noted that, that the field of view corresponding to the monochrome image obtained through cropping is the same as the field of view corresponding to the monochrome image obtained through cropping may be specifically as follows: When a difference between the two field of views falls within a preset error range, it is equivalent that the two field of views are the same.

105. The mobile phone determines, from the monochrome image obtained through cropping and the color image obtained through cropping, one target monochrome image with high image quality and one target color image with high image quality based on information collected by a gyro sensor, contrast information of the monochrome image, and contrast information of the color image.

In this embodiment, when there are at least two black images, the mobile phone selects, based on the information collected by the gyro sensor and the contrast information of the monochrome images, the target monochrome image that has high image quality and that is photographed in a relatively static environment. Likewise, when there are at least two color images, the mobile phone selects the target color image based on the information collected by the gyro sensor and the contrast information of the monochrome images.

A gyroscope is configured to detect jitter information existing when the user performs photographing. Generally, smaller jitter information indicates a clearer photo obtained through photographing. Contrast is a factor that reflects image definition. Generally, an image having larger contrast is clearer.

In addition, it should be noted that when there is one black image, the mobile phone directly determines the black image as the target monochrome image. Likewise, when there is one color image, the mobile phone directly determines the color image as the target color image.

106. The mobile phone performs depth calculation on the target monochrome image and the target color image to obtain depth information.

Figure 12:
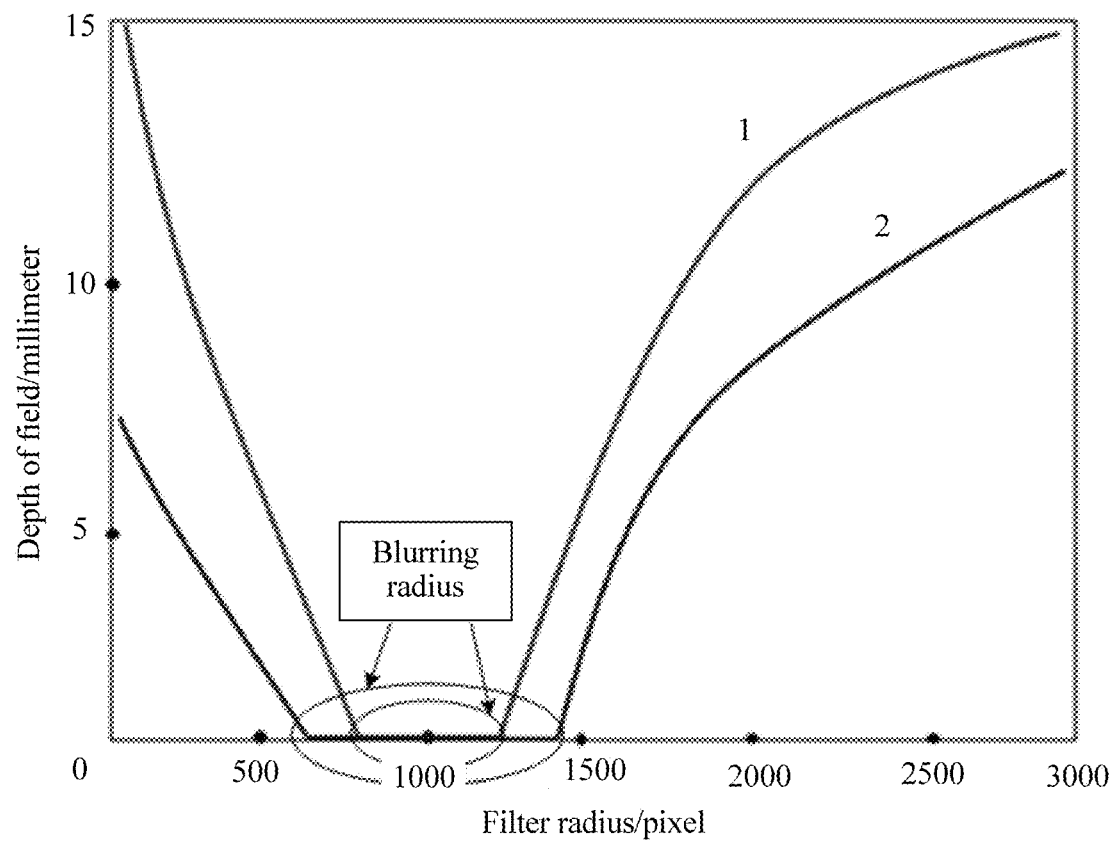
FIG. 12 is a depth of field-distance curve diagram according to an embodiment of the present invention.

In this embodiment, after selecting the target monochrome image and the target color image, the mobile phone calculates, by using a binocular stereoscopic vision principle, a binocular depth of field map corresponding to a photographing scene, that is, a depth of field-distance curve diagram, which is shown in FIG. 12. The depth of field-distance curve diagram includes a relationship curve that is between a depth of field and a distance and that is corresponding to a different aperture value, that is, the depth information. In FIG. 12, an aperture value corresponding to a curve 1 is greater than an aperture value corresponding to a curve 2. The binocular stereoscopic vision is a principle for emulating two eyes of a person by using two camera lenses, to view an object, and the principle is used to calculate the depth information of the target scene. In this embodiment of the present invention, one of the two camera lenses is a monochrome MONO camera lens, and the other one is a color camera lens.

That depth calculation is performed by using the binocular stereoscopic vision principle to obtain the binocular depth of field map is specifically as follows: After the target monochrome image and the target color image are selected, a pixel parallax map corresponding to each of the target color image and the target monochrome image is first calculated by using an optical flow field corresponding to the target image, so that a pixel parallax value corresponding to each pixel in the target monochrome image and the target color image is obtained; and then scene depth information is calculated according to a calculation formula $$d = \frac{f * T}{c}$$

obtained by using the binocular stereoscopic vision principle. T is a distance between the monochrome camera lens and the color camera lens, c is a pixel parallax value of a corresponding pixel, and f is an actual focal length. When the black camera lens and the color camera lens focus on a same object simultaneously, after focusing is performed, a focal length of the monochrome camera lens is equal to that of the color camera lens according to a camera imaging principle, that is, the actual focal length f.

In addition, when resolution of an original image is dH*dW, resolution of an effective scene depth map is $$\frac{dH}{m} * \frac{dW}{m} (m \geq 2^3),$$

and an effective depth range of a wide aperture is L meters. When zooming is not performed, to improve scene depth calculation performance, downsampling may be directly performed on an input image to generate a scene calculation original map whose resolution is $$\frac{cH}{m} * \frac{dH}{m},$$

and then a binocular depth of field map is calculated. After X× zooming is performed, provided that resolution of an image obtained through cropping is not less than $$\frac{1}{m} * \frac{1}{m}$$

times resolution of an image existing before cropping is performed, depth accuracy of the binocular depth of field map obtained after depth calculation is performed on the scene depth calculation original map whose resolution is $$\frac{dH}{m} * \frac{dW}{m}$$

is not affected, where the scene depth calculation original map is obtained by performing downsampling on the image obtained through cropping. In this case, the effective depth range of the wide aperture is X times the original effective depth range, that is, XL meters. Specifically, the target color image is used as an example. When m is equal to 8, the resolution of the target color image is 3968*2976. In a normal wide aperture mode, when zooming is not performed, downsampling is performed on the target color image to generate a scene depth calculation original map whose resolution is 496*372, and depth calculation is performed on the scene depth calculation original map whose resolution is 496*372, to obtain a binocular depth map whose resolution is 496*372. In this case, the effective distance of the wide aperture is 2 meters. After zooming is performed based on the target zoom ratio 3× and cropping is performed in step 103, it may be determined that resolution of a target color image obtained through cropping is 496*372, and the resolution of the target color image falls within an effective range. Depth accuracy of the binocular depth map obtained after depth calculation is performed on the scene calculation original map whose resolution is 496*372 is not affected, where the scene calculation original map is obtained by performing downsampling on the target color image. In this case, the effective distance of the wide aperture is 2*3=6 meters, and 3× is the target zoom ratio. When the target zoom ratio is 3×, an equivalent focal length of the monochrome camera lens and the color camera lens is between 75 mm and 85 mm. The equivalent focal length is a focal length of the equivalent camera lens when the monochrome camera lens and the color camera lens are used as a whole, that is, equivalent to one camera lens.

107. The mobile phone performs background blurring on the color zoom image based on the depth information.

Figure 11:
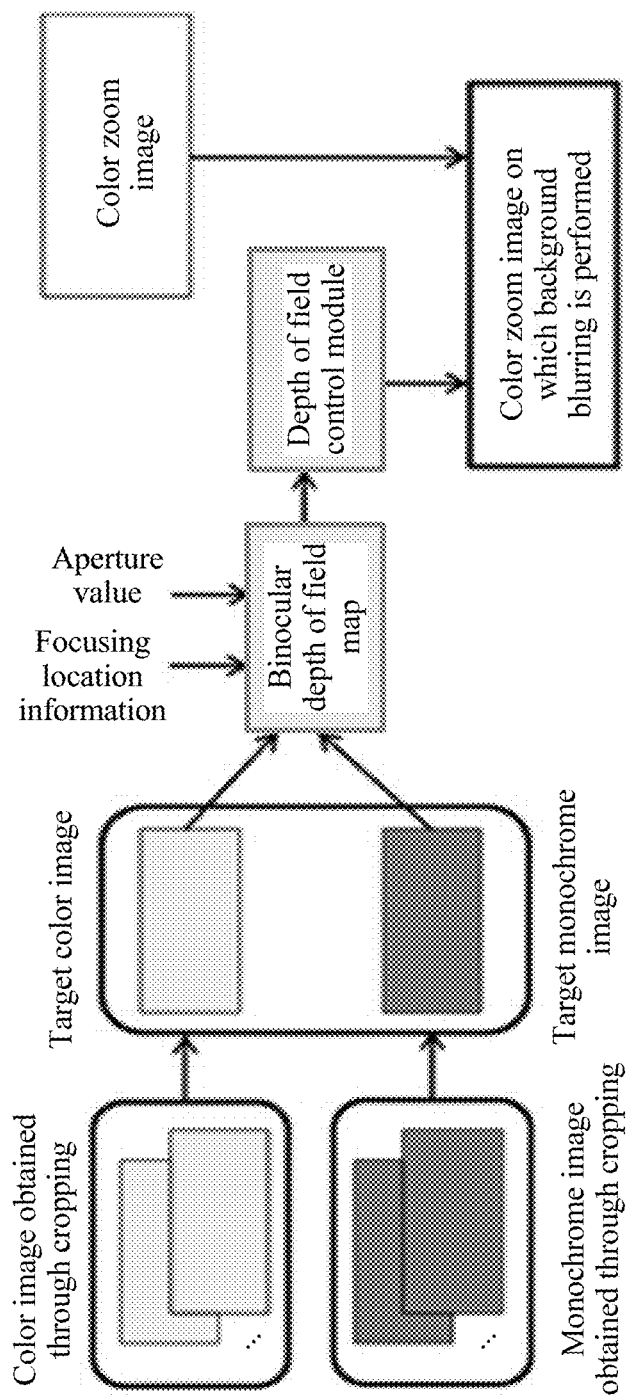
FIG. 11 is a schematic diagram of background burring according to an embodiment of the present invention.

In this embodiment, background blurring is performed on the color zoom image based on the depth information, to generate a wide aperture blurring effect through combination. As shown in FIG. 11, after the depth of field-distance curve diagram is obtained, a depth of field control module determines foreground depth of field based on foreground location information selected through focusing; obtains, based on a depth of field-distance curve corresponding to a wide aperture value such as the curve 1, a scene depth value corresponding to each pixel; and obtains a corresponding blurring radius by using the curve 1, to perform blurring such as Gaussian blurring on the color zoom image by using a specific filter, so as to obtain the color zoom image on which background blurring is performed.

Figure 13:
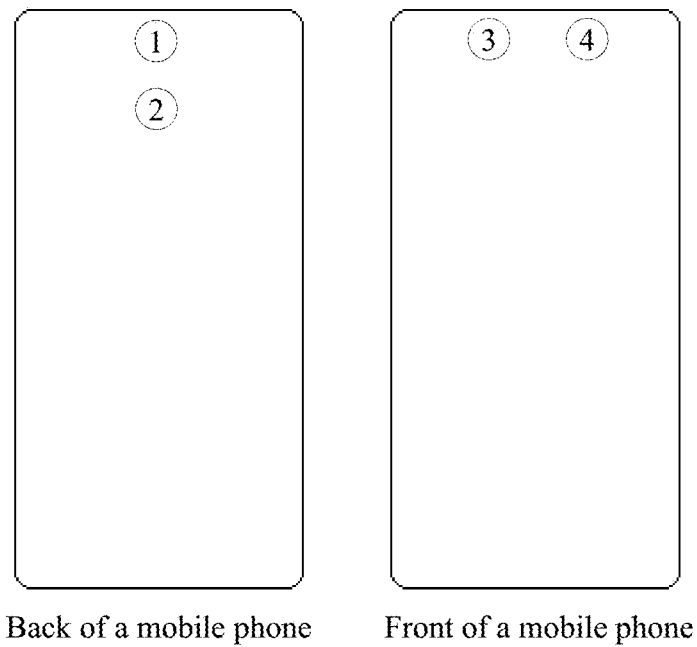
FIG. 13 is a schematic diagram of locations of twin camera lenses according to an embodiment of the present invention.

In addition, in this embodiment, a method for placing a camera lens of a mobile phone is shown in FIG. 13. A color camera lens 1 and a monochrome camera lens 2 on the back of the mobile phone are placed in parallel and are located on a same plumb line. A color camera lens 3 and a monochrome camera lens 4 on the front of the mobile phone are placed in parallel and are located on a same horizontal line. It should be noted that the placement method shown in FIG. 13 is only one of placement methods, and another placement method that can achieve a same technical effect as the foregoing placement method is not limited herein.

In this embodiment, in one aspect, the detail resolution capability of the color zoom image obtained through fusion is greatly improved, and this may be equivalent to an optical zoom effect at the same zoom ratio; and in another aspect, the foreground depth of field is determined based on the foreground location information selected through focusing, the scene depth value corresponding to each pixel is obtained based on the depth of field-distance curve such as the curve 1 corresponding to the wide aperture value, and a corresponding blurring radius is obtained by using the curve 1, to perform blurring such as Gaussian blurring on the color zoom image by using a specific filter, so that an optical zoom effect at the same target zoom ratio and a wide aperture background blurring effect are implemented. Therefore, in the photographing method of the mobile phone in this embodiment of the present invention, a clearer image can be obtained, and a photographing effect of the mobile phone can be improved.

After step 104, this embodiment of the present invention may further include the following steps.

201. Identify a region of interest ROI in the color zoom image.

202. Perform blurring processing on a region other than the region of interest in the color zoom image.

In the image processing field, a region of interest (ROI, full name: region of interest) is an image region selected from an image, and the region is a focus during image analysis. For example, a foreground of an image is a person, and a background is a dog. If the user focuses on the person in the image, the person in the image is the ROI; or if the user focuses on the dog in the image, the dog in the image is the ROI.

A wide aperture effect is implemented by performing blurring processing on the region other than the region of interest. The wide aperture effect is a photographing effect obtained by emulating a single-lens reflex camera. For example, when the user focuses on the person, during photographing by using the single-lens reflex camera, the person in the image is clear while the dog in the image is blurred. The wide aperture effect described in this embodiment of the present invention is obtained by emulating this photographing effect of the single-lens reflex camera lens.

The photographing method for a terminal in the embodiments of the present invention is described in detail in the foregoing embodiment, and the following describes the terminal in the embodiments of the present invention in detail.

Figure 14:
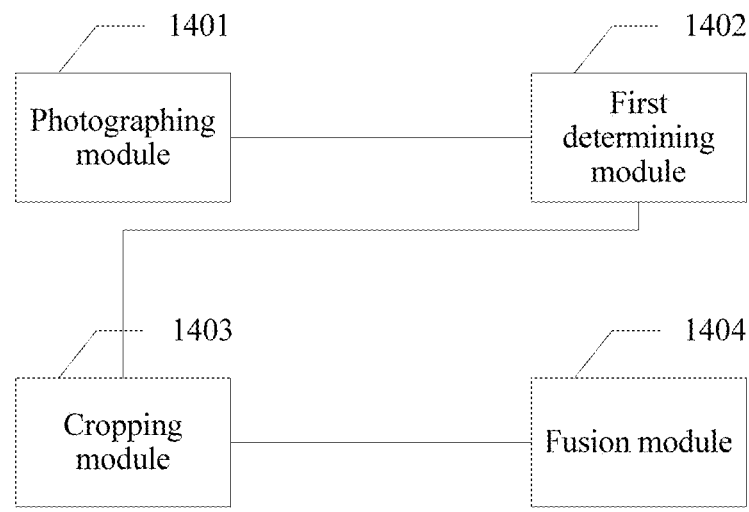
FIG. 14 is a schematic diagram of an embodiment of a terminal according to an embodiment of the present invention.

Referring to FIG. 14, a mobile phone is used as an example to describe a terminal in an embodiment of the present invention in detail. The mobile phone includes: two camera lenses, where one lens is a monochrome camera lens, the other lens is a color camera lens, the monochrome camera lens is configured to photograph a monochrome image, the color camera lens is configured to photograph a color image, resolution of the monochrome camera lens is higher than resolution of the color camera lens, and an optical axis of the monochrome camera lens is parallel to that of the color camera lens; a photographing module 1401, configured to simultaneously photograph a monochrome image and a color image of a target scene, where resolution of the monochrome image is higher than that of the color image, and there is at least one monochrome image and at least one color image; a first determining module 1402, configured to determine a target zoom ratio; a cropping module 1403, configured to correspondingly crop the monochrome image and the color image based on the target zoom ratio, where a field of view corresponding to a monochrome image obtained through cropping is the same as a field of view corresponding to a color image obtained through cropping; and a fusion module 1404, configured to perform fusion on the monochrome image obtained through cropping and the color image obtained through cropping, to obtain a color zoom image.

The module in this embodiment of the present invention is corresponding to the method in the method embodiment, and details are not described herein.

In this embodiment, the photographing module 1401 simultaneously photographs a plurality of monochrome images and a plurality of color images of the target scene, the cropping module 1403 performs cropping correspondingly based on the target zoom ratio determined by the first determining module 1402, and then the fusion module 1404 performs fusion on monochrome images obtained through cropping and color images obtained through cropping, to obtain the color zoom image. It may be understood that, in one aspect, because the monochrome image obtained through cropping and the color image obtained through cropping have a same field of view, and the resolution of the monochrome camera lens is higher than the resolution of the color camera lens, when the monochrome image obtained through cropping is compared with the color image obtained through cropping, resolution of the monochrome image obtained through cropping is still higher than that of the color image. Therefore, the color zoom image obtained through fusion has a higher detail resolution capability, and this is equivalent to an optical zoom effect at the same zoom ratio. Therefore, in this embodiment of the present invention, zoom effects at different zoom ratios can be implemented.

Figure 15:
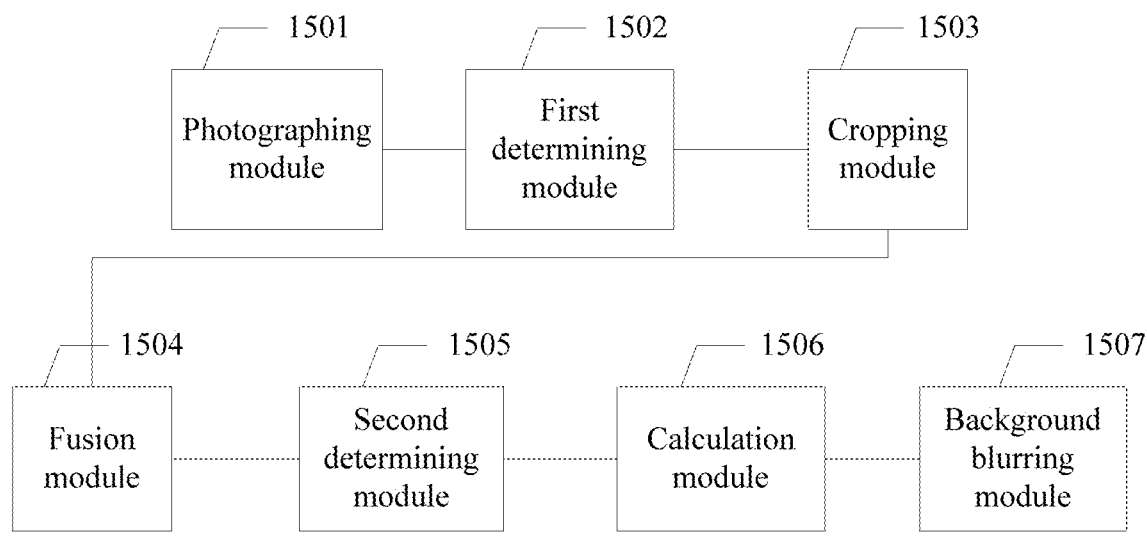
FIG. 15 is a schematic diagram of another embodiment of a terminal according to an embodiment of the present invention.

In addition, as shown in FIG. 15, the mobile phone further includes: a second determining module 1505, configured to: when there are at least two black images and/or at least two color images, determine, from monochrome images obtained through cropping and color images obtained through cropping, one target monochrome image with high image quality and one target color image with high image quality based on information collected by a gyro sensor, contrast information of the monochrome images, and contrast information of the color images; a calculation module 1506, configured to perform depth calculation on the target monochrome image and the target color image to obtain depth information; and a background blurring module 1507, configured to: when there are at least two black images and/or at least two color images, perform background blurring on the color zoom image based on the depth information corresponding to the target scene.

In this embodiment, depth calculation is performed by using the high-quality target color image and the high-quality target monochrome image that are determined by the second determining module 1505, so that accuracy of the depth information can be effectively improved. The background blurring module 1507 may perform background blurring processing on the color zoom image, so that an image on which background blurring processing is performed is clearer, and has a brighter color.

Figure 16:
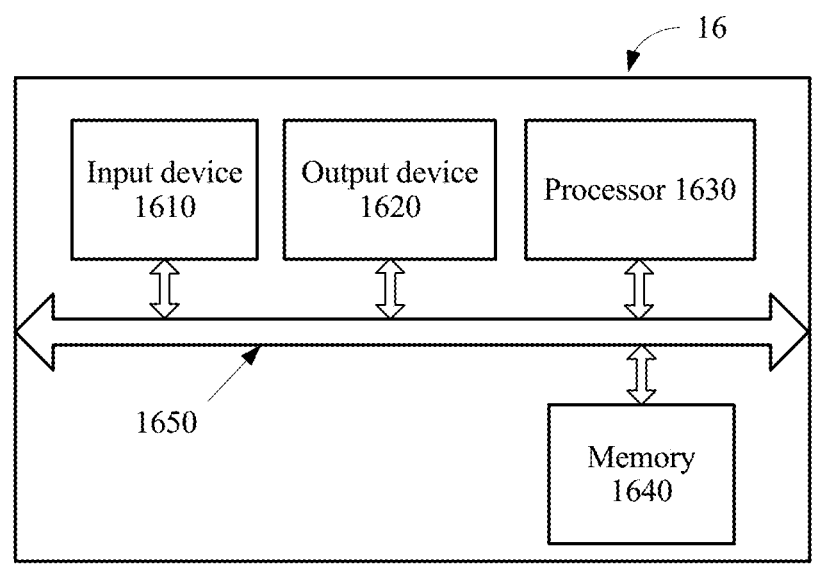
FIG. 16 is a schematic diagram of another embodiment of a terminal according to an embodiment of the present invention.

Referring to FIG. 16, a terminal in an embodiment of the present invention is described, and a mobile phone 16 includes: an input device 1610, an output device 1620, a processor 1630, a memory 1640, and a bus 1650.

The memory 1640 may include a read-only memory and a random access memory, and provide an instruction and data for the processor 1630. A part of the memory 1640 may further include a nonvolatile random access memory (Non-volatile Random Access Memory, NVRAM for short).

The memory 1640 stores the following elements: an executable module or a data structure, or a subset thereof, or an extended set thereof: an operation instruction, including various operation instructions and used to implement various operations; and an operating system, including various system programs and used to implement various basic services and process a hardware-based task.

In addition, the input device 1610 may be specifically two camera lenses, where one lens is a monochrome camera lens, the other lens is a color camera lens, the monochrome camera lens is configured to photograph a monochrome image, the color camera lens is configured to photograph a color image, resolution of the monochrome camera lens is higher than resolution of the color camera lens, and an optical axis of the monochrome camera lens is parallel to that of the color camera lens.

In this embodiment of the present invention, the processor 1630 is configured to: simultaneously photograph a monochrome image and a color image of a target scene, where resolution of the monochrome image is higher than that of the color image, and there is at least one monochrome image and at least one color image; determine a target zoom ratio;

correspondingly crop the monochrome image and the color image based on the target zoom ratio, where a field of view corresponding to a monochrome image obtained through cropping is the same as a field of view corresponding to a color image obtained through cropping; and perform fusion on the monochrome image obtained through cropping and the color image obtained through cropping, to obtain a color zoom image.

The processor 1630 controls an operation of the mobile phone terminal 16, and the processor 1630 may also be referred to as a central processing unit (Central Processing Unit, CPU for short). The memory 1640 may include a read-only memory and a random access memory, and provide an instruction and data for the processor 1630. A part of the memory 1640 may further include an NVRAM. In specific application, all components of the first terminal 16 are coupled together by using the bus system 1650, and in addition to a data bus, the bus system 1650 may further include a power bus, a control bus, a status signal bus, and the like. However, for clarity of description, various buses are marked as the bus system 1650 in the figure.

The apparatus in this embodiment of the present invention is corresponding to the method in the method embodiment, and details are not described herein.

The method disclosed in the foregoing embodiment of the present invention may be applied to the processor 1630, or may be implemented by the processor 1630. The processor 1630 may be an integrated circuit chip, and has a signal processing capability. In an implementation process, the steps in the foregoing method may be completed by using an integrated logic circuit of hardware in the processor 1630 or an instruction in a form of software. The processor 1630 may be a general purpose processor, a digital signal processor (Digital Signal Processor, DSP for short), an application-specific integrated circuit (Application-Specific Integrated Circuit, ASIC for short), a field-programmable gate array (Field-Programmable Gate Array, FPGA for short) or another programmable logic device, a discrete gate or a transistor logic device, or a discrete hardware assembly; and may implement or execute the methods, steps, and logical block diagrams that are disclosed in the embodiments of the present invention. The general purpose processor may be a microprocessor, or the processor may be any conventional processor or the like. The steps of the method disclosed with reference to the embodiments of the present invention may be directly performed and completed by using a hardware decoding processor, or performed and completed by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory 1640. The processor 1630 reads information in the memory 1640, and completes the steps of the foregoing method in combination with hardware of the processor 1630.

For related descriptions of FIG. 16, refer to related descriptions and effects of the method parts in FIG. 1 for understanding. Details are not described herein.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are only intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
  obtaining, by a terminal, a target zoom ratio, wherein the terminal comprises a plurality of camera lenses, the plurality of camera lenses comprises a monochrome camera lens and a color camera lens, the monochrome camera lens is configured to photograph static or dynamic monochrome images, the color camera lens is configured to photograph static or dynamic color images, resolution of the monochrome camera lens is higher than resolution of the color camera lens, and an optical axis of the monochrome camera lens is parallel to that of the color camera lens;

simultaneously photographing, by the terminal, a first monochrome image and a first color image of a target scene based on the target zoom ratio, wherein a resolution of the first monochrome image is higher than a resolution of the first color image;

correspondingly cropping, by the terminal, the first monochrome image and the first color image based on the target zoom ratio to obtain a second monochrome image and a second color image, wherein a field of view corresponding to the second monochrome image is the same as a field of view corresponding to the second color image; and performing fusion, by the terminal, on the second monochrome image and the second color image, to obtain a color zoom image.

2. The method according to claim 1, wherein the field of view corresponding to the second monochrome image is the same as the field of view corresponding to the second color image, and resolution of the second monochrome image is at least 1.6 times resolution of the second color image.

3. The method according to claim 1, wherein the target zoom ratio is 3×, and an equivalent focal length of the monochrome camera lens and the color camera lens is between 75 mm and 85 mm.

4. The method according to claim 1, wherein after the color zoom image is obtained, the method further comprises:

identifying a region of interest (ROI) in the color zoom image; and performing blurring processing on a second region in the color zoom image, wherein the second region is different than the ROI.

5. The method according to claim 4, wherein performing blurring processing on the second region in the color zoom image comprises:

calculating scene depth information of the color zoom image according to a binocular stereoscopic vision principle; and performing blurring processing on the second region in the color zoom image based on foreground information of the color zoom image, an aperture value FUM of each of the monochrome camera lens and the color camera lens, and the scene depth information.

6. The method according to claim 5, wherein:

simultaneously photographing, by the terminal, the first monochrome image and the first color image of the target scene based on the target zoom ratio comprises:

simultaneously photographing, by the terminal, a plurality of first monochrome images and a plurality of first color images of the target scene based on the target zoom ratio; and calculating the scene depth information of the color zoom image according to the binocular stereoscopic vision principle comprises:

selecting, from the plurality of first monochrome images and the plurality of first color images based on contrast information of the plurality of first monochrome images, contrast information of the plurality of first color images, and information collected by a gyroscope of the terminal, one first monochrome image and one first color image that have minimum jitter information or maximum contrast information, and calculating the scene depth information of the color zoom image based on the selected one first monochrome image, the selected one first color image, and the binocular stereoscopic vision principle.

7. A terminal, comprising:

a plurality of camera lenses, wherein the plurality of camera lenses comprises a monochrome camera lens and a color camera lens, the monochrome camera lens is configured to photograph static or dynamic monochrome images, the color camera lens is configured to photograph static or dynamic color images, resolution of the monochrome camera lens is higher than resolution of the color camera lens, and an optical axis of the monochrome camera lens is parallel to that of the color camera lens;

a processor; and a non-transitory computer-readable storage medium storing a program to be executed by the processor, the program including instructions for:

obtaining a target zoom ratio;

simultaneously photographing, using the plurality of camera lenses, a first monochrome image and a first color image of a target scene based on the target zoom ratio, wherein a resolution of the first monochrome image is higher than a resolution of the first color image;

correspondingly cropping the first monochrome image and the first color image based on the target zoom ratio to obtain a second monochrome image and a second color image, wherein a field of view corresponding to the second monochrome image is the same as a field of view corresponding to the second color image; and performing fusion on the second monochrome image and the second color image, to obtain a color zoom image.

8. The terminal according to claim 7, wherein the program further includes instructions for:

identifying a region of interest (ROI) in the color zoom image; and performing blurring processing on a second region in the color zoom image, wherein the second region is different than the ROI.

9. The terminal according to claim 8, wherein performing blurring processing on the second region in the color zoom image comprises:

calculating scene depth information of the color zoom image according to a binocular stereoscopic vision principle; and performing blurring processing on the second region in the color zoom image based on foreground information of the color zoom image, an aperture value FUM of each of the monochrome camera lens and the color camera lens, and the scene depth information.

10. The terminal according to claim 9, wherein:

simultaneously photographing, by the terminal, the first monochrome image and the first color image of a target scene based on the target zoom ratio comprises:

simultaneously photographing, by the terminal, a plurality of first monochrome images and a plurality of first color images of the target scene based on the target zoom ratio; and calculating the scene depth information of the color zoom image according to the binocular stereoscopic vision principle comprises:

selecting, from the plurality of first monochrome images and the plurality of first color images based on contrast information of the plurality of first monochrome images, contrast information of the plurality of first color images, and information collected by a gyroscope of the terminal, one first monochrome image and one first color image that have minimum jitter information or maximum contrast information, and calculating the scene depth information of the color zoom image based on the selected one first monochrome image, the selected one first color image, and the binocular stereoscopic vision principle.

11. The terminal according to claim 7, wherein the field of view corresponding to the second monochrome image is the same as the field of view corresponding to the second color image, and resolution of the second monochrome image is at least 1.6 times resolution of the second color image.

12. The terminal according to claim 7, wherein the target zoom ratio is 3×, and an equivalent focal length of the monochrome camera lens and the color camera lens is between 75 mm and 85 mm.

13. A non-transitory computer-readable storage medium storing a program to be executed by a processor, the program including instructions for:
obtaining a target zoom ratio,
simultaneously photographing, using a plurality of camera lenses, a first monochrome image and a first color image of a target scene based on the target zoom ratio, wherein a resolution of the first monochrome image is higher than a resolution of the first color image, the plurality of camera lenses comprises a monochrome camera lens and a color camera lens, the monochrome camera lens is configured to photograph static or dynamic monochrome images, the color camera lens is configured to photograph static or dynamic color images, resolution of the monochrome camera lens is higher than resolution of the color camera lens, and an optical axis of the monochrome camera lens is parallel to that of the color camera lens;
correspondingly cropping the first monochrome image and the first color image based on the target zoom ratio to obtain a second monochrome image and a second color image, wherein a field of view corresponding to the second monochrome image is the same as a field of view corresponding to the second color image; and
performing fusion on the second monochrome image and the second color image, to obtain a color zoom image.

14. The non-transitory computer-readable storage medium according to claim 13, wherein the field of view corresponding to the second monochrome image is the same as the field of view corresponding to the second color image, and resolution of the second monochrome image is at least 1.6 times resolution of the second color image.

15. The non-transitory computer-readable storage medium according to claim 13, wherein the target zoom ratio is 3×, and an equivalent focal length of the monochrome camera lens and the color camera lens is between 75 mm and 85 mm.

16. The non-transitory computer-readable storage medium according to claim 13, wherein after the color zoom image is obtained, the program further includes instructions for:
identifying a region of interest (ROI) in the color zoom image; and
performing blurring processing on a second region in the color zoom image, wherein the second region is different than the ROI.

17. The non-transitory computer-readable storage medium according to claim 16, wherein performing blurring processing on the second region in the color zoom image comprises:
calculating scene depth information of the color zoom image according to a binocular stereoscopic vision principle; and
performing blurring processing on the second region in the color zoom image based on foreground information of the color zoom image, an aperture value FUM of each of the monochrome camera lens and the color camera lens, and the scene depth information.

18. The non-transitory computer-readable storage medium according to claim 17, wherein:
simultaneously photographing the first monochrome image and the first color image of a target scene based on the target zoom ratio comprises:
simultaneously photographing a plurality of first monochrome images and a plurality of first color images of the target scene based on the target zoom ratio; and
calculating the scene depth information of the color zoom image according to the binocular stereoscopic vision principle comprises:
selecting, from the plurality of first monochrome images and the plurality of first color images based on contrast information of the plurality of first monochrome images, contrast information of the plurality of first color images, and information collected by a gyroscope, one first monochrome image and one first color image that have minimum jitter information or maximum contrast information, and calculating the scene depth information of the color zoom image based on the selected one first monochrome image, the selected one first color image, and the binocular stereoscopic vision principle.

* * * * *